March 26, 1946. W. H. SCHNEIDER 2,397,159
COLLET CHUCK
Filed Nov. 6, 1943
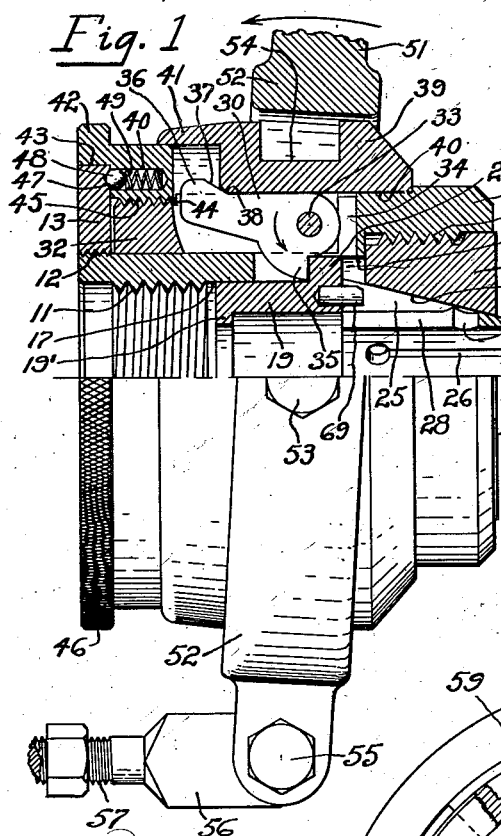
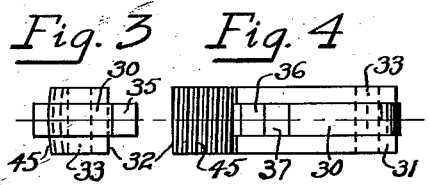
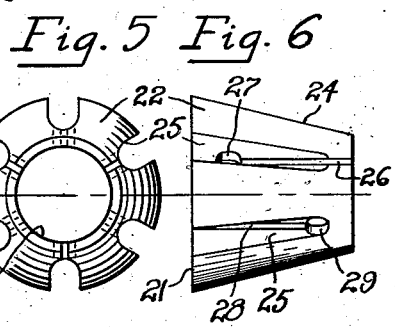
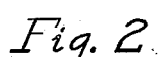
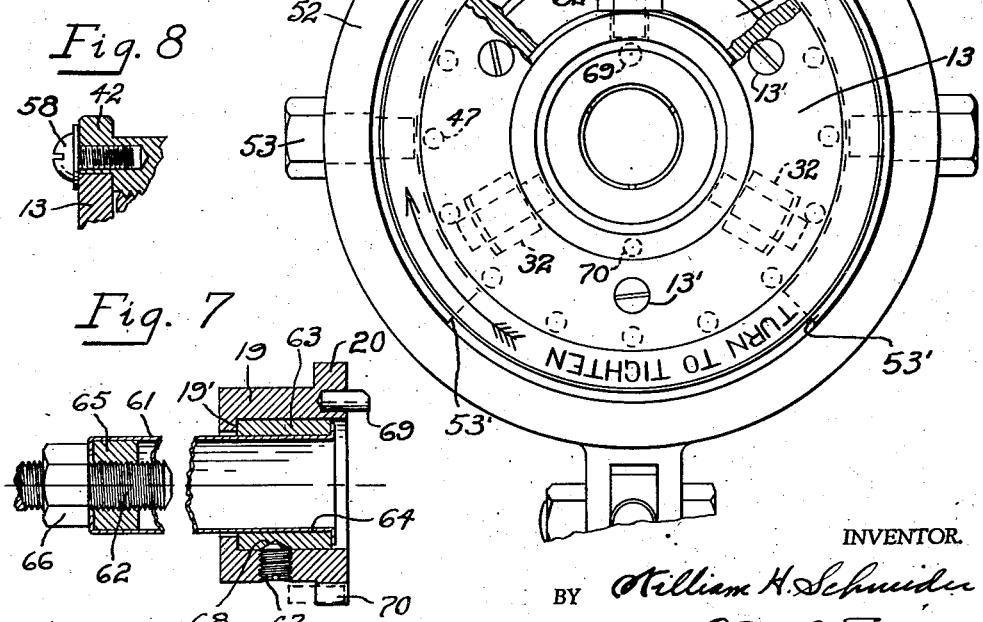
INVENTOR.
BY William H. Schneider
Louis O. French Atty.

Patented Mar. 26, 1946

2,397,159

UNITED STATES PATENT OFFICE 2,397,159

COLLET CHUCK

William H. Schneider, Milwaukee, Wis.

Application November 6, 1943, Serial No. 509,171

7 Claims. (Cl. 279—51)

The invention relates to collet chucks and more particularly to collet chucks which are used on lathes, screw machines, and similar machine tools.

One object of the invention is to provide a collet chuck of compact construction in which the collet may be released and tightened while the machine on which it is used is running and which permits the use of the full diameter of the spindle bore for the feed through of the stock.

A further object of the invention is to provide a collet type chuck which is readily adjustable to change the position of the collet closing cams or levers to accommodate stock of different diameters or small changes in the diameter of the stock while using the same collet.

A further object of the invention is to provide a quick closing and opening collet chuck having an adjustable back stop for second operation or short length work.

The invention further consists in the several features hereinafter set forth and more particularly defined by claims at the conclusion hereof.

In the drawing:

Fig. 1 is a view partly in vertical section and partly in elevation of a chuck embodying the invention;

Fig. 2 is a rear elevation view of the chuck, parts being broken away and parts being shown in section;

Fig. 3 is a detailed end view of the closing cam and its mounting;

Fig. 4 is a side elevation view of said cam and its mounting;

Fig. 5 is a front elevation view of one of the collets;

Fig. 6 is a side elevation view of the collet shown in Fig. 5;

Fig. 7 is a detailed sectional view of the adjustable back stop and the chuck collar associated therewith;

Fig. 8 is a detailed sectional view showing a modified form of locking means for the adjusting nut or member.

Referring to the drawing, the numeral 10 designates the chuck body which is in the form of a sleeve having its rear portion interiorly threaded at 11 to engage the threaded end of the spindle of the lathe or automatic screw machine or other machine tool in which the stock is to be mounted. The member 10 is threaded exteriorly at its rear portion 12 to receive a back or flange plate 13 and at its forward end is internally threaded at 14 to receive the threaded collet engaging sleeve 15 which is of hardened steel and has a tapered bore 16. When in use, the sleeve 15 forms in effect a part of the body 10, but it is made separable in order to permit the changing of collets by the temporary removal of said sleeve 15 and its replacement after a collet has been inserted in the chuck. The body 10 has concentric bores 17 and 18 in which a collet-engaging flanged sleeve or collar 19 is slidably mounted, the flanged end 20 of said sleeve engaging the base portion 21 of a collet 22.

The collet 22 is a frustro-conical member of spring steel having a straight cylindrical bore or other shape 23 and a tapered outer surface 24 which is of the same taper as the bore 16. The collet is recessed at circumferentially spaced intervals by lengthwise extending recesses 25 which extend from the base for the greater or total part of the length of the collet as shown in Figs. 1 and 6. A slot is cut through the collet along the base of each recess, the slot 26 starting from the front of the collet for every other recess and terminating a short distance from the rear in a hole or enlargement 27 and the slot 28 starting from the rear of the collet for the other recesses and terminating in a hole or enlargement 29 at the end of the recess. The recesses and the slots provide a relatively short collet whose bore diameter may be contracted by squeezing or forcing the conical surface 24 thereof outwardly relative to the bore 16 of the chuck body, this action taking place by the forward movement of the collar 19 relative to said body and the reverse movement or expansion of the collet occurring when the collar 19 is permitted to move backwardly.

For moving the collar 19 and the collet 22 to work clamping position, a series of collet closing cams or levers 30 are provided. Each lever 30 is pivotally mounted in the forked end 31 of a support 32 on a pin 33, and each support is slidably mounted in a radially disposed slot 34 extending from the rear of the chuck body to the front portion thereof, said slot being cut through to the inner bores 17 and 18 of said body adjacent the collar 19 to permit engagement of the flange of said collar 19 by the short arm 35 of said lever. The longer arm 36 of each lever 33 projects rearwardly and has a tapered camming surface 37 which is adapted to be engaged by the rear edge 38 of an operating ring 39 which is slidably mounted on the cylindrical surface 40 of said chuck body and has a ring extension 41 that slidably fits over the adjusting collar or nut 42 and prevents dirt and chips getting into the chuck operating mechanism. The nut 42 is rotatably mounted on the back plate 13 which projects into a counter bore 43 in said nut to limit its lengthwise movement in one direction and which movement is limited in the other direction by a shoulder 44 formed on the body. Thus the nut 42 can be turned relative to the body and its back plate 13, and it is threaded to engage the threaded portions 45 of each closing lever support 32, so that turning said nut will cause the supports 32 to be fed forwardly or backwardly, depending upon the direction of rotation of said nut, in the slots 34 to advance or retract the operating position of the levers 30 relative to the collar 19, so that said collar will exert a closing engagement on the collet 22 sooner or later. The nut has a knurled face 46 to provide a good hand grip.

For holding the adjusting nut 42 in adjusted position, I have shown in Figs. 1 and 2 a series of recesses 47 formed in the back plate in radially spaced positions and one or more ball bearings 48 forming a detent adapted to be pressed into any one of the recesses 47 by a spring 49 mounted in a bore 40 in the nut 42.

It has been noted that the operating ring 39 is adapted to move rearwardly to move the levers 30 to collet closing position, and conversely a forward movement of said collar will permit the release of said levers from a holding action on the collet, which due to its resiliency, will restore the collar 19 and the levers to their initial or release position shown in Fig. 1. The ring may be moved in various ways. When the chuck is mounted on a lathe, the ring is usually moved by a lever 51 which has a yoke portion 52 provided with diametrically disposed shoes 53' engaging in a groove 54 in said ring and carried by pins 53 mounted in the yoke 52, the lever being pivotally anchored to the lathe by a pin or pivot bolt 55 which is carried in a bracket 56 that has a stud portion 57 adapted to be mounted in a suitable part of the head stock of the lathe. When used on an automatic screw machine, the annular groove 54 of the collar receives shoes from a yoke member which is suitably operated by the usual mechanism of the machine, and this structure has not been shown. It will also be understood that any other suitable mechanism for shifting the collar known in the art can be used.

With this construction, bar stock can be fed through the bore of the spindle of the machine tool in connection with which the work is being done and through the chuck and the bore of the collet and gripped whenever desired by the rearward movement of the ring 39 which, as noted above, causes a contracting of the collet through pressure exerted between the collars or sleeves 15 and 19, and on a forward shifting movement of the ring this pressure is relieved, so that the stock may again be moved forwardly in the collet to its next position.

Instead of using the spring pressed ball detents to lock the nut 42 in various radial positions relative to the chuck body, I may provide one or more screw bolts 58 mounted in the nut 42 and having a head adapted to clampingly engage the back face of the back plate 13 as shown in Fig. 8. The operating clutch ring 39 may be slidably keyed to the chuck body by a key member 59 mounted in the ring and projecting into a key slot 60 in the chuck body 10.

It is frequently desirable to use chucks of this kind in connection with second operation work or partially turned stock, and in many cases under those conditions it is desirable to positively fix the distance that the portion of the work extends into the chuck so as to position the work for further operations, and in this connection it is desirable to provide a positive stop engaged by the work on its movement to inward position, and for this purpose I have provided the stop structure shown in Fig. 7, in which a sleeve structure 61 is adapted to be inserted in the flanged collar 19 and has a stop rod or screw 62 adjustably mounted therein at its inner end. More particularly, the sleeve structure comprises a relatively thick metal ring 63, a thin metal sleeve member 64 welded, braised, or otherwise integrally connected to the ring 63 at its forward end and similarly connected to a nut 65 at its rear end in which the adjustable stock rod or screw 62 is mounted and to which it is clamped in adjusted position by a lock nut 66. To prevent rotation of the stop member relative to the chuck a set screw 67 mounted in the collar 19 is adapted to engage in a recess 68 in the ring 63. With this stop member positioned in the collar 19 with ring 63 abutting the flange 19' in said ring and the stop rod 62 adjusted to the proper position within the sleeve 64, the stock may be pushed through the collar until its inner end abuts said stop member 62 and will then be in a position for second operation work upon it, as for instance by the use of some cutting tool that is fed along the work to a definite position.

The back flange plate 13 is provided with holes adapted to receive the screws 13', said screws are provided to hold said flange plate to the body 10 and also prevent it from being unscrewed from the thread 12 on the body.

To prevent the collar 19 and collet 22 from turning and causing undue wear in the body 10 while in use, the collar 19 is provided with the securely attached pin 69. The protruding part of said pin extends loosely into one of the recesses 25 of the collet, thereby keying said collar and collet loosely together. To anchor the collar and collet in said body, the pin 70 as shown in relative position with the collar 19 in Fig. 7 is securely mounted in the shoulder between the bores 17 and 18 of the body and loosely engages the hole or slot in the flange 20, thereby keying the said body and collar together.

It is to be noted that the bore 23 of the collet may be other than circular; for example, it may be of hexagonal, square, or octagonal shape to accommodate stock of such shape, and it is further noted that when this bore is of small size, that the recesses 25 extend the whole length of the collet, so that the wall thickness of the collet at the bases of these recesses is relatively thin to provide the requisite flexibility for operation of the collet. Where the recesses extend the full length of the collet, the slots such as the slots 28 terminate in the enlargements 29, but these enlargements are not at the end of the recesses but are then positioned near the front end of the collet since the recess extends the full length of the collet.

I desire it to be understood that this invention is not to be limited to any particular form or arrangement of parts except in so far as such limitations are included in the claims.

What I claim as my invention is:

1. A collet chuck for a collet having a tapered side surface and a base comprising a chuck body, said chuck body having a part provided with a tapered bore engaging the tapered side surface of said collet; a shiftable collar mounted in said body and engaging the base of said collet, a plurality of pivoted collet closing levers engageable with said collar, a separate support for the pivot of each lever adjustably mounted in said chuck body, and a shiftable operating member for moving said levers to collet closing position.

2. A collet chuck for a collet having a tapered side surface and a base comprising a chuck body, a spring collet having a tapered side surface and a base, said chuck body having a part provided with a tapered bore engaging the tapered side surface of said collet, a shiftable collar mounted in said body and engaging the base of said collet, a plurality of pivoted collet closing levers engageable with said collar, a separate support for the pivot of each lever slidably mounted in said chuck body and having a threaded portion, a manually adjustable nut rotatably mounted on said chuck body and engageable with the threaded portions of said supports to advance or retract the same relative to said collar, means for securing said nut to said body in different positions of adjustment and means for simultaneously moving all of said levers to collet closing position.

3. A collet chuck for a collet having a tapered side surface and a base comprising a hollow chuck body having a part provided with a tapered bore engaging the tapered side surface of said collet and a plurality of radially disposed lengthwise extending slots in its peripheral portion, a shiftable collar slidably mounted in said body and engaging the base of the collet, said body having concentric bores in which said collar operates, one of said bores communicating with said radially disposed slots, a lever support slidably mounted in each of said slots and keyed thereby to said body, a multiplying lever pivotally mounted on each of said supports, the shorter arms of said levers engageable with said collar, and a sleeve member slidably mounted over the outer portion of said body and having a camming engagement with the longer arms of said levers.

4. A collet chuck for a collet having a tapered side surface and a base comprising a hollow chuck body having a part provided with a tapered bore engaging the tapered side surface of said collet and a plurality of radially disposed lengthwise extending slots in its peripheral portion, a shiftable collar slidably mounted in said body and engaging the base of the collet, said body having concentric bores in which said collar operates, one of said bores communicating with said radially disposed slots, a lever support slidably mounted in each of said slots and keyed thereby to said body, a multiplying lever pivotally mounted on each of said supports, the shorter arms of said levers engageable with said collar, and a sleeve member having camming engagement with the longer arm of said levers slidably mounted over the outer portion of said body and completely covering said slots in all of its operating positions.

5. A collet chuck for a collet having a tapered side surface and a base comprising a hollow chuck body having concentric inner bores with a tapered bore communicating with one of said concentric bores and engageable with the tapered side surface of the collet and a plurality of radially disposed lengthwise extending slots in its peripheral portion communicating with the larger of said concentric bores, said body portion also having a back plate, a nut mounted to rotate on said back plate and having a forwardly extending cylindrical portion, a shiftable collar slidably mounted in said body within said concentric bores and engageable with the base of the collet, a lever support slidably mounted in each of said slots and keyed thereby to said body, each lever support having a threaded portion engageable with said nut, means for securing said nut in different angular positions relative to said body to thereby secure said supports in different longitudinal displacements relative to said body, a multiplying lever pivotally mounted on each of said supports, the shorter arms of said levers engageable with said collar, and a sleeve member having camming engagement with the longer arms of said levers slidably mounted over the outer portion of said body and the cylindrical portion of said nut and completely covering said slots in all of its operating positions.

6. In a collet chuck, the combination with a chuck body and a shiftable collar mounted in said body and cooperating therewith to contract a collet about the work, of a plurality of pivoted collet closing levers engageable with said collar, a separate support for the pivot of each lever lengthwise slidably mounted in said body, a collar rotatably mounted on said body and operatively connected to the pivot supports for said levers to vary the position of said levers relative to said shiftable collar, means for locking said rotatable collar to said body in different positions of adjustment, and means for simultaneously moving all of said levers to collet closing position.

7. In a collet chuck, the combination with a chuck body and a shiftable collar mounted in the body and cooperating therewith to contract a collet about the work, of a plurality of pivoted collet closing levers engageable with said collar, a separate support for the pivot of each lever lengthwise adjustably mounted in said chuck body, means for adjusting the positions of said separate supports relative to said collar, and a shiftable operating member for moving said levers to collet closing position.

WILLIAM H. SCHNEIDER.